United States Patent
Fujiyoshi et al.

(10) Patent No.: US 7,653,300 B2
(45) Date of Patent: Jan. 26, 2010

(54) IMAGE RECORDING APPARATUS FOR MICROSCOPES

(75) Inventors: Koji Fujiyoshi, Hachioji (JP); Jitsunari Kojima, Hachioji (JP)

(73) Assignee: Olympus Corporation, Tokyo (JP)

( * ) Notice: Subject to any disclaimer, the term of this patent is extended or adjusted under 35 U.S.C. 154(b) by 449 days.

(21) Appl. No.: 11/376,232

(22) Filed: Mar. 16, 2006

(65) Prior Publication Data
US 2006/0210262 A1 Sep. 21, 2006

(30) Foreign Application Priority Data
Mar. 18, 2005 (JP) .............................. 2005-080655

(51) Int. Cl.
*G03B 17/00* (2006.01)
*G03B 29/00* (2006.01)
*H04N 7/18* (2006.01)

(52) U.S. Cl. .................... 396/265; 396/429; 348/79

(58) Field of Classification Search ................ 396/213, 396/237, 240, 265, 429; 348/79, 362
See application file for complete search history.

(56) References Cited

U.S. PATENT DOCUMENTS

| 4,202,610 A | 5/1980 | Kittag |
| 5,848,177 A * | 12/1998 | Bauer et al. ................ 382/128 |
| 2004/0080661 A1 | 4/2004 | Afsenius et al. |
| 2004/0150724 A1 | 8/2004 | Nozaki et al. |
| 2004/0183921 A1 | 9/2004 | Ueda |
| 2006/0044394 A1 * | 3/2006 | Read ....................... 348/207.1 |

FOREIGN PATENT DOCUMENTS

| JP | 2000-209477 | 7/2000 |
| JP | 2002-84454 | 3/2002 |
| JP | 2004-233664 | 8/2004 |
| JP | 2004-235781 | 8/2004 |

* cited by examiner

*Primary Examiner*—Rodney E Fuller
(74) *Attorney, Agent, or Firm*—Arnold International; Bruce Y. Arnold

(57) ABSTRACT

An image recording apparatus for a microscope having a still camera function and/or a video photography function is disclosed. Automatic exposure (AE) adjustment is performed at appropriate time intervals in the photographic period so as to obtain sample images of roughly uniform brightness. Also, image data and data of plural photographic conditions are recorded in a single photographic session by setting up an AE adjustment time (Tae) and an exposure time (Texp) so as not to exceed a photographic interval (Tint) that is constant.

10 Claims, 11 Drawing Sheets

IMAGE RECORDING APPARATUS FOR MICROSCOPES

CROSS REFERENCE TO RELATED APPLICATION

The present application claims benefit of priority under 35 U.S.C. §119 of JP 2005-080655, filed Mar. 18, 2005, the contents of which are hereby incorporated by reference.

FIELD OF THE INVENTION

The present invention relates to an image recording apparatus for a microscope, which is mounted to the microscope and mainly records the morphological changes of living cells and luminous quantity as image data, and relates in particular to an image recording apparatus that performs an amount of exposure adjustment taking into consideration the dynamic range of an image pickup device.

RELATED ART

Image recording apparatuses such as digital still cameras, electronic cameras (e.g., video cameras), and so on, that convert an object image formed by a photographic optical system such as a photographic lens into an electric signal using a solid state image pickup device have been widely popularized. Typically these devices use a CCD (Charge Coupled Device) image pickup device and they record the object image as digital image data on a recording medium while at the same time recording information concerning the photographic condition, such as the image brightness, during photography.

Beside common photographic uses as in recording scenes or figures as the object, such an image recording apparatus for a microscope can be connected to the microscope to record the observed state of living body tissues or cells. Recently, especially in studies in cell biology and nerve systems, an image recording apparatus for a microscope that captures time-lapse changes of morphology and the luminous quantity of living cells (as opposed to dead or immobile cells) and its associated method have been required. Motion picture photography and time-lapse photography (wherein still images are recorded at given time intervals) are methods for observing or numerically analyzing time-lapse changes of morphology and the luminous quantity of the living cells.

FIG. 10 is a block diagram that shows the system components of a commonly used, prior art image recording apparatus for a microscope 200. In the image recording apparatus for a microscope, when motion picture photography or time-lapse photography is performed, the exposure time is made constant by the opening/closing of an exposure control mechanism 101 or a mechanical shutter 104 that controls the time that light is incident onto a CCD 105 so as to capture changes, such as transitions of the morphology of cells and changes in the luminous intensity of cells observed during fluorescence observation.

In FIG. 10, there are provided an exposure control driver 102, a filter 103, a CCD driver 106, a preprocessing circuit (e.g., a gain control amplifier) 107, a digital processing circuit 108, a brightness correction section 108A, a gradation correction section 108B, a liquid crystal display LCD 109, a system controller 110, a timer 110A, a memory 111, a recording medium 112, an operating part 113, and an electrically erasable and programmable read-only memory EEPROM 114.

When a low-brightness sample image is recorded using time-lapse photography, the exposure time Texp may range from several seconds to tens of seconds and there is a possibility that it may exceed the photographic interval Tint.

A technique is disclosed in Japanese Laid-Open Patent Application 2004-233664 wherein time-lapse photography is performed by fixing the exposure time so as to avoid the exposure time from becoming longer than the photographic interval in the case of the photographic interval being short. As shown in FIG. 11, which is a timing chart showing the elapsed time, when the exposure time Texp is fixed, if it can be ensured that the exposure time Texp is less than the photographic interval Tint, the photographic wait time Twait will be positive and the exposure time Texp during photography will not exceed the photographic interval.

However, the brightness of a sample sometimes decreases with the passage of time. A method for providing hardware such as a gain control amplifier 107A and a brightness correction section 108A (shown in FIG. 10) has also been disclosed so as to maintain the brightness.

Brightness is ensured by these mechanisms. However, image noise increases and gradation characteristics cannot be fully ensured because image information read from a CCD is low in its existent state and the images are processed in subsequent steps.

A method wherein gradation characteristics and sensitivity are maintained even if the γ value that is set by an operator changes is disclosed in Japanese Laid-Open Patent Application 2002-84454. Namely, image information read from a CCD is corrected using a suitable γ value by a gradation correction section 108B, and the exposure time is controlled based on the output level after gradation correction. This method is directed to changes of gradation characteristics depending on the γ value, but fluctuations of the brightness of an object itself (i.e., a sample) have not yet been mentioned.

On the other hand, when motion picture photography or time-lapse photography is performed under two or more photographic conditions and exposure conditions, if a single measurement time Tmes (that equals the sum of photographic intervals Tint) is extended, the stress that is sustained by cells of the sample due to being exposed to the excitation light increases.

Cells may be damaged by a single measurement and the reproducibility of the experiment cannot be ensured in the case of photography where there is considerable stress given to the cells. If a variety of photographic conditions and exposure conditions can be measured in one photographic session, as shown in FIG. 12, not only can the stress applied to cells be decreased but the measurement time can be reduced.

A method wherein dynamic and static information of an object are simultaneously measured by providing a CCD for motion picture photography and a CCD for static image photography is disclosed in Japanese Laid-Open Patent Application 2000-209477. A method wherein photography of an object is simultaneously performed under different conditions by using plural electronic still cameras, providing a communication means for inter-connecting the cameras, setting different photographic conditions and exposure conditions among the cameras (bracketing) and cooperatively simultaneously accomplishing photography in one photographic session is disclosed in Japanese Laid-Open Patent Application 2004-235781.

If the exposure time is fixed in motion picture photography and in time-lapse photography, the brightness difference of the sample from the start to the end of a measurement may be large, or the brightness of the sample may change from a very bright region to a very dark region, or vice versa. When the brightness difference exceeds the dynamic range of a CCD, image noise increases, the gradation characteristic deteriorates, and deficiencies of data due to white and black collapse easily occur. Moreover, if gain correction and brightness correction are applied to image information read from a CCD in subsequent steps, the gradation characteristics of the image deteriorate.

As disclosed in Japanese Laid-Open Patent Applications 2002-209477 and 2004-235781, photography can be simultaneously performed under plural photographic conditions and exposure conditions in time-lapse photography by providing plural systems of CCD-containing photographic mechanisms and image recording apparatuses. However, it is not easy to carry out this method because the scale of the observation apparatuses increases.

BRIEF SUMMARY OF THE INVENTION

The present invention provides an image recording apparatus for a microscope that can obtain image data of roughly uniform brightness without impairing the sensitivity and gradation characteristic of the image by applying one or plural optimum exposure conditions and photographic conditions, suppressing the brightness difference of the image, and image recording the morphological changes and luminous quantity of living cells. To achieve this, first the present invention provides an image recording apparatus for a microscope that is mounted to the microscope and performs time-lapse photography of an object, accomplishes exposure control at desired time intervals in a photographic time period, establishes exposure conditions for photography within a dynamic range inherent in a CCD solid state image pickup device that is provided in the image recording apparatus when the luminous brightness of the object changes with the passage of time, and thus obtains an image to be recorded at a roughly uniform brightness.

Second, the present invention provides an image recording apparatus for a microscope that is mounted to the microscope and performs time-lapse photography of an object. It also accomplishes exposure control when the absolute value of change in brightness value of the object exceeds a pre-determined threshold value, establishes exposure conditions for photography within a dynamic range inherent in a solid state image pickup device (CCD) provided in the image recording apparatus when the luminous brightness of the object changes with the passage of time, and obtains an image to be recorded at a roughly uniform brightness.

Third, the present invention provides an image recording apparatus for a microscope that is mounted to the microscope and performs time-lapse photography of an object and accomplishes exposure control at a desired time interval established prior to the photography. It also establishes exposure conditions for photography within a dynamic range inherent in a solid state image pickup device (CCD) for image recording provided in the image recording apparatus when the luminous brightness of the object changes with the passage of time, and obtains an image to be recorded at a roughly uniform brightness.

Fourth, the present invention provides a photographic method of using the image recording apparatus for a microscope that is mounted to the microscope and performs time-lapse photography of an object, and establishes a photographic time interval Tint. It also establishes a target exposure value and a region for performing exposure control arithmetic processing during time-lapse photography, establishes a maximum value of time Tae for exposure adjustment in conformity with the target exposure value, establishes a maximum value of time Texp for the exposure, and makes a minimum photographic wait time Twait positive when subtracting the sum of the maximum value Tae and the maximum value Texp from the photography time interval Tint.

Fifth, the present invention provides a photographic method of using the image recording apparatus for a microscope that is mounted to the microscope and performs time-lapse photography of an object, and establishes a photographic time interval Tint. It also establishes a target exposure value necessary for exposure control photography, an exposure region and an exposure time necessary for a fixed-exposure (i.e., manual) photography mode, establishes a maximum time Tae for exposure adjustment during AE photography, establishes a maximum time TexpA for exposure during AE photography, establishes a maximum time TexpM for exposure during manual photography, and ensures that a minimum photographic wait time Twait [MIN] is positive relative to the value of Tint−(Texp[MAX] +Tae[MAX] +TexpM).

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
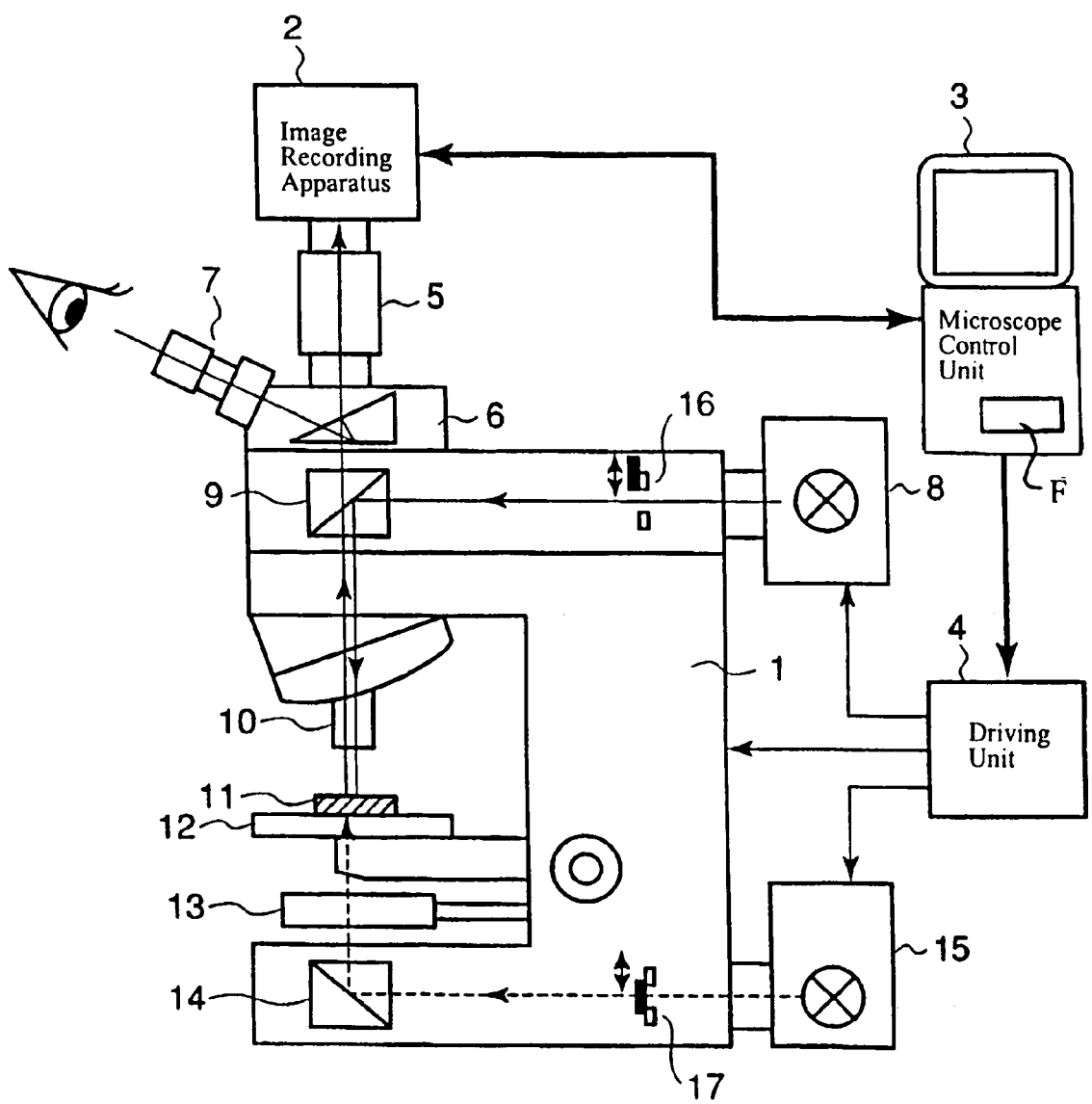
FIG. 1 illustrates the major components of an image recording apparatus for a microscope.

FIG. 1 shows the major components of a microscope system mounted with an image recording apparatus for a microscope. This microscope system is provided with a microscope body 1, an image recording apparatus 2 that includes an image pickup device for performing photography of a sample observed using the microscope, a microscope control unit 3 that includes a drive F for reading a storage medium such as a floppy disc, a driving unit 4 for driving the microscope body 1, a reflection illumination light source 8, and a transmission illumination light source 15. The image recording apparatus may be, for example, an electronic camera having a digital still camera function and a digital video camera function.

In the microscope body 1, an objective lens 10 is arranged in a position opposite to a sample 11 mounted on a stage 12 that is movable in three dimensions. The objective lens 10 may, for example, be mounted on a revolver so that the objective lens in use may be selected from plural objective lenses (not shown). An eye lens unit 7 is arranged on an observation optical axis passing through the objective lens 10 that is selected by rotation of the revolver via a trinocular unit 6. Similarly, an imaging lens unit 5 is provided above the trinocular unit 6 on the observation optical axis, and the image recording apparatus 2 may be mounted to the imaging lens unit 5.

Figure 10:
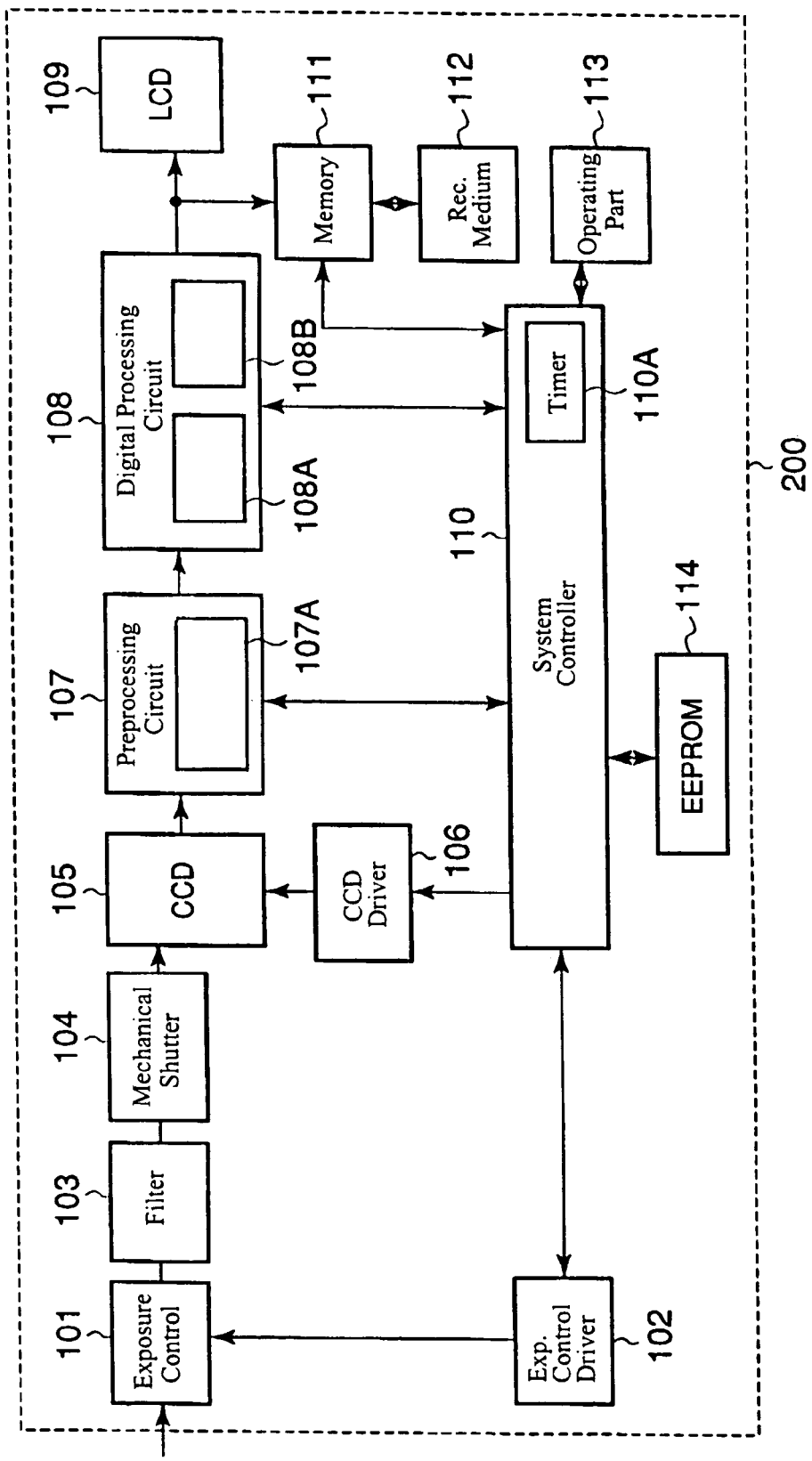
FIG. 10 is a block diagram that shows the system components of a commonly used, prior art image recording apparatus for a microscope.
Figure 11:
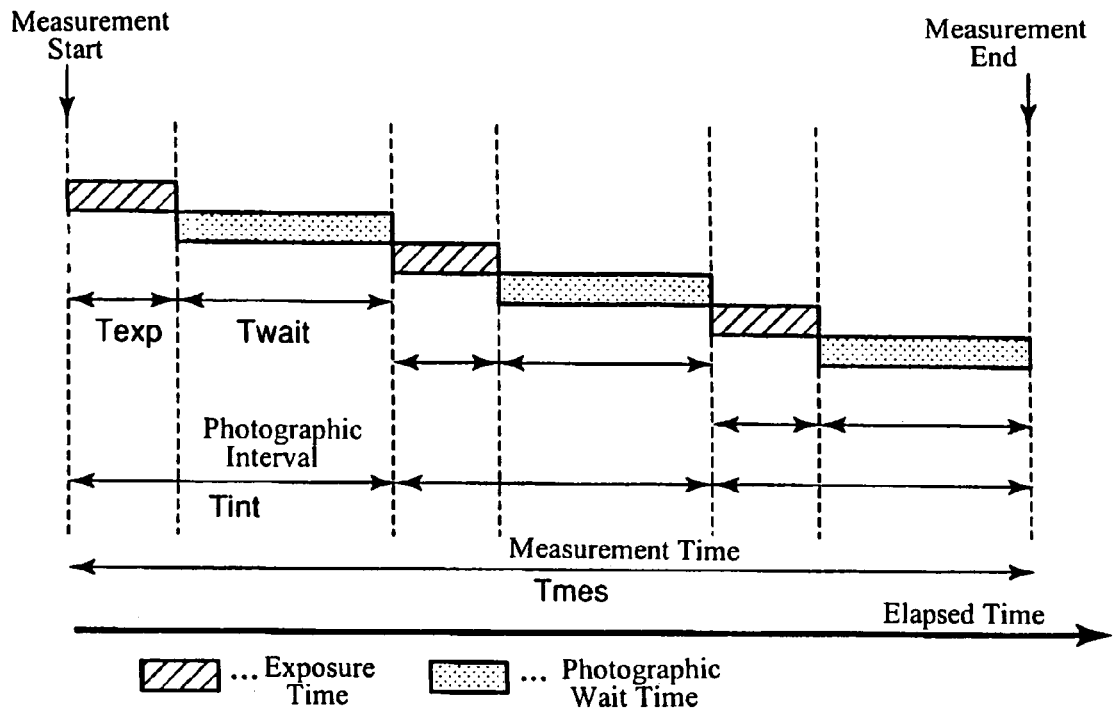
FIG. 11 is a timing chart showing the components of the measurement period Tmes used in the prior art image recording apparatus for a microscope illustrated in FIG. 10.
Figure 12:
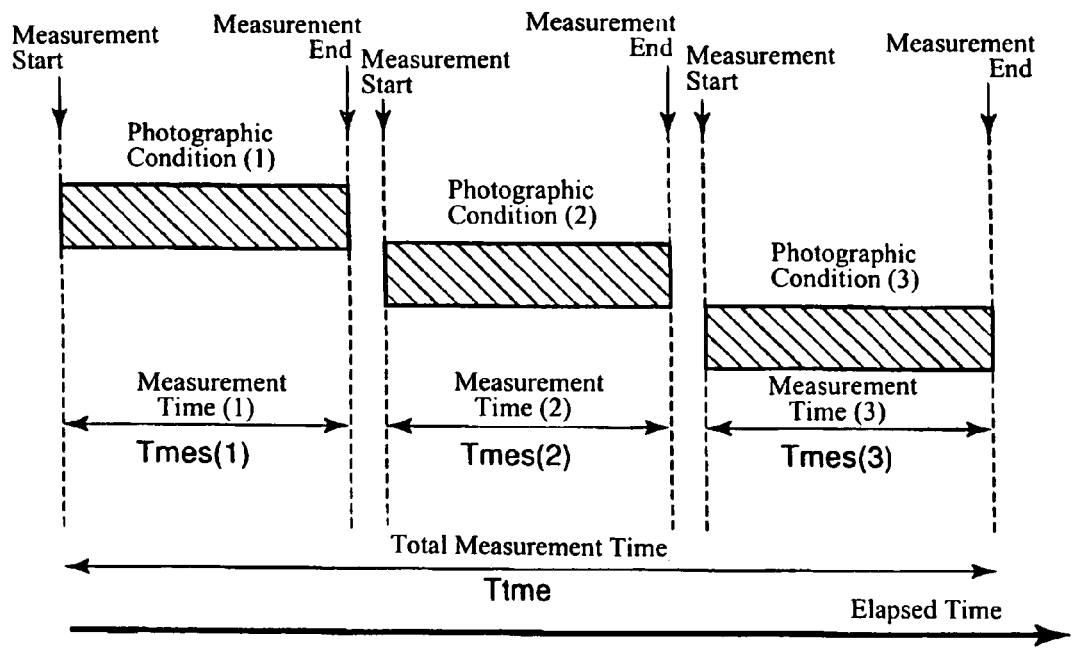
FIG. 12 is a timing chart showing the components of the total measurement period Ttme in the case of performing time-lapse photography or motion picture photography successively using plural photographic conditions.

The microscope control unit 3 gives an instruction to the driving unit 4 to perform tuning of the transmission illumination light source 15 and the reflection illumination light source 8 according to a controller (equivalent to the system controller 110 in FIG. 10, but not separately illustrated) for deciding photographic conditions in the image recording apparatus 2. The driving unit 4 performs positional control of the stage 12, selection of the objective lens 10 from among plural objective lenses, and selection of beam splitters in the beam splitting cube unit 9. A shutter 16 for the reflection illumination light source is provided on the optical axis of an illumination light beam from the reflection illumination light source 8 to the beam splitting cube unit 9.

A shutter 17 for the transmission illumination light source 15, a condenser optical element unit 13 and a mirror 14 are arranged below the stage 12 on the optical axis of the illumination light beam from the transmission illumination light source 15 to the sample 11. The shutter 16 for the reflection illumination light source and the shutter 17 for the transmission illumination light source are opened/closed by the driving unit 4, which is controlled by the microscope control unit 3, when waiting for photography in time-lapse photography and the respective illumination lights (excitation lights) are shielded at the time of waiting during time-lapse photography so as to not irradiate light onto the sample 11 during the waiting periods, thereby minimizing damage to the cells of the sample 11 due to the illumination lights.

The operation of the microscope system will now be described. During bright field microscopic observation, light emitted from the transmission illumination light source 15 is reflected by the mirror 14 and enters the rear side of the sample 11 after an aperture adjustment is performed using the condenser optical element unit 13. An observation image obtained using light transmitted through the sample 11 is magnified by the objective lens 10. The observation image received from the objective lens 10 further passes through the beam splitting cube unit 9 and reaches the trinocular unit 6. The observation image is split into two light beams in the trinocular unit 6. One is directed to the eye lens unit 7 and the other is directed via the imaging lens unit 5 to a solid state image pickup device, in particular—a CCD, in the image recording apparatus 2.

During microscopic examination using fluorescent light observation, light irradiated from the reflection illumination light source 8 is split by the beam splitting cube unit 9 and passes through the objective lens 10 so as to irradiate the sample 11 as excitation light. The sample emits a fluorescence weaker than the excitation light, and the emitted light is magnified as an observation image by the objective lens 10, split into two light beams (each of wavelength different from the excitation light) by a beam splitter in the beam splitting cube unit 9 and is incident onto the solid state image pickup device CCD of the image recording apparatus 2.

Various embodiments of the present invention will now be described in detail with reference to the drawings.

EMBODIMENT 1

Figure 2:
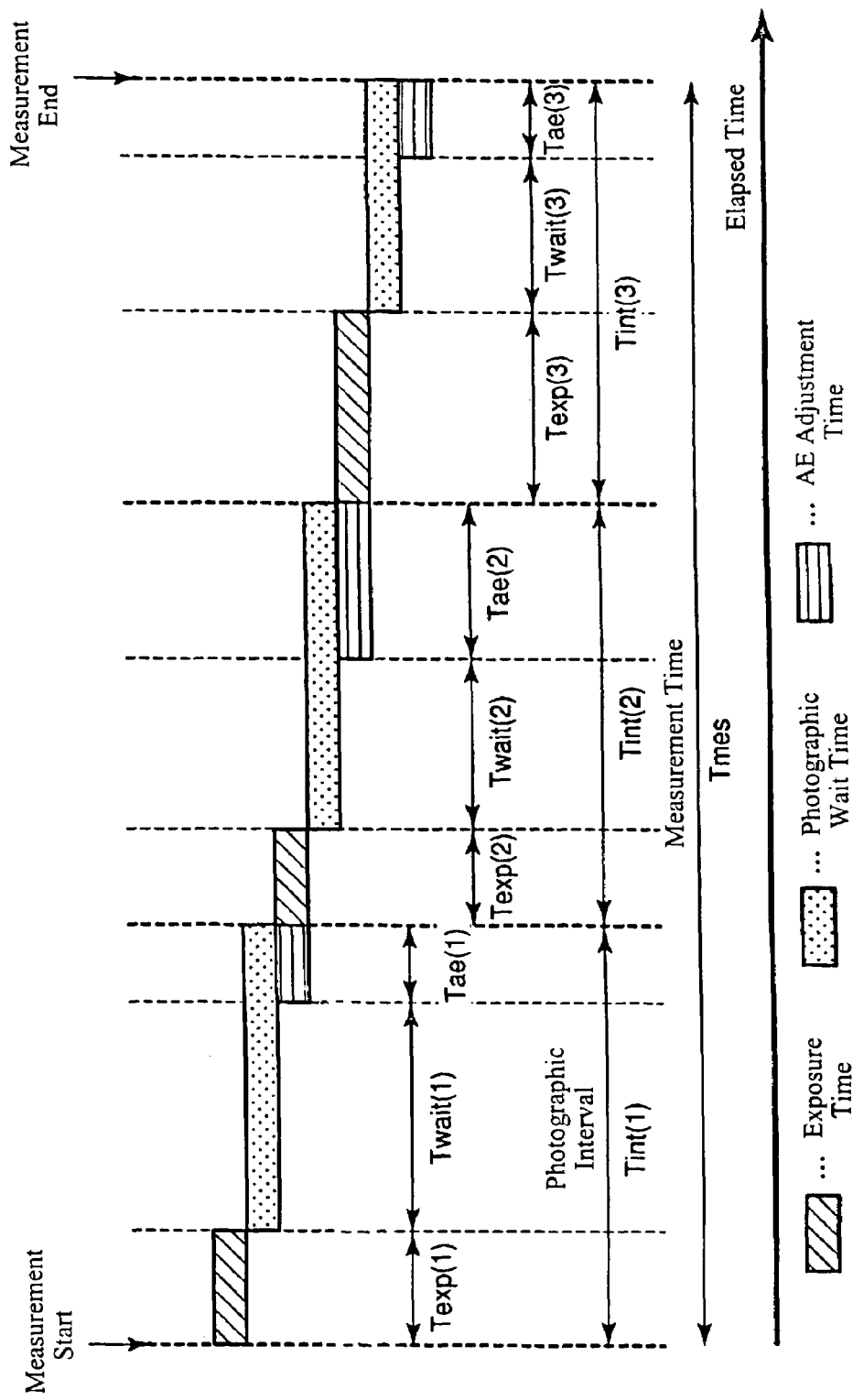
FIG. 2 is a timing chart showing the relationship between the measurement procedures performed versus elapsed time during time-lapse photography in Embodiment 1.

In this embodiment, brightness adjustment using automatic exposure (AE) control is accomplished by providing a given time interval when the image recording apparatus performs time-lapse photography using a still camera function. FIG. 2 shows the details of the measurement timing during time-lapse photography for this embodiment. In this embodiment, the adjustment time Tae for AE adjustment occurs before a still image is acquired by the CCD. Accordingly, the exposure time Texp for photography at every given time interval Tint may be different. For example, in order to maintain the photographic interval Tint constant, the following conditions must be satisfied:

$$Tint > Texp + Tae \qquad \text{Condition (1)}$$

$$Twait > 0 \qquad \text{Condition (2),}$$

where
Tint is the photographic time interval,
Texp is the exposure time for photography,
Tae is the adjustment time for AE adjustment, and
Twait is the photographic wait time.

Processing before the start of measurement will now be described with reference to the flow chart shown in FIG. 3. The maximum values of the AE adjustment times (from the vicinity of a brightness value of zero to an AE target value or from the maximum brightness value to the AE target value) for a region in which AE adjustment is to be performed are stored in a data base. Similarly, the maximum value of the exposure time is stored in a database. However, the maximum values of the AE adjustment times and the maximum value of the exposure time are found by performing a preliminary measurement. When the maximum values found here clearly do not satisfy a condition that will be described later, processing (described later) is interrupted and the acquiring of a photography image is abandoned.

Figure 3:
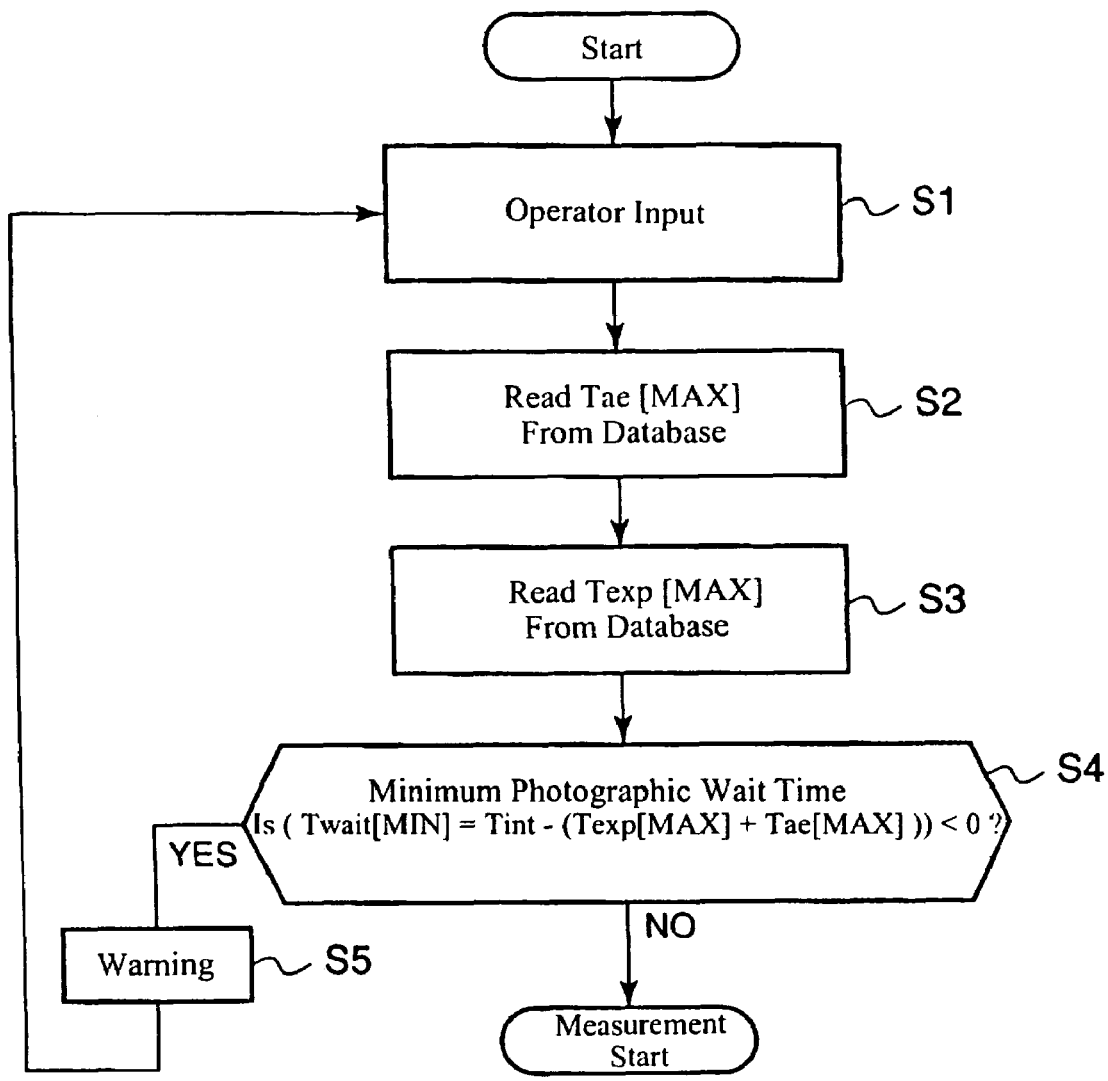
FIG. 3 is a flow chart showing the processing steps before the start of measurements in Embodiment 1.

Referring to FIG. 3, the operating procedure before the start of measurements is as follows. The step above step S1 indicates this is the start of this sequence of operations. In step S1, the operator inputs the photographic interval, the AE target value, and defines the AE region (i.e., the screen area where AE operation in time-lapse photography is to occur). In step S2, the maximum value of AE adjustment time Tae [MAX] is read from the AE target value database. In step S3, the maximum value of exposure time Texp[MAX] is read from the AE target value database. In step S4, it is determined whether Twait[MIN]<0 by calculating whether the minimum photographic wait time Twait[MIN] (which equals Tint− (Texp[MAX]+Tae [MAX])), is less than zero. If the result of the calculation Twait[MIN]<0 is YES, in step S5, a warning is issued and the operator is urged to reset the AE target value. Flow is then returned to the step S1 and the process is repeated. On the other hand, if the result of the calculation Twait[MIN]<0 is NO (indicating that it is possible to prevent the sum of fluctuating exposure times and of the AE adjustment times from exceeding the photographic interval), the flow continues to the process shown in FIG. 4, which will be described next.

Figure 4:
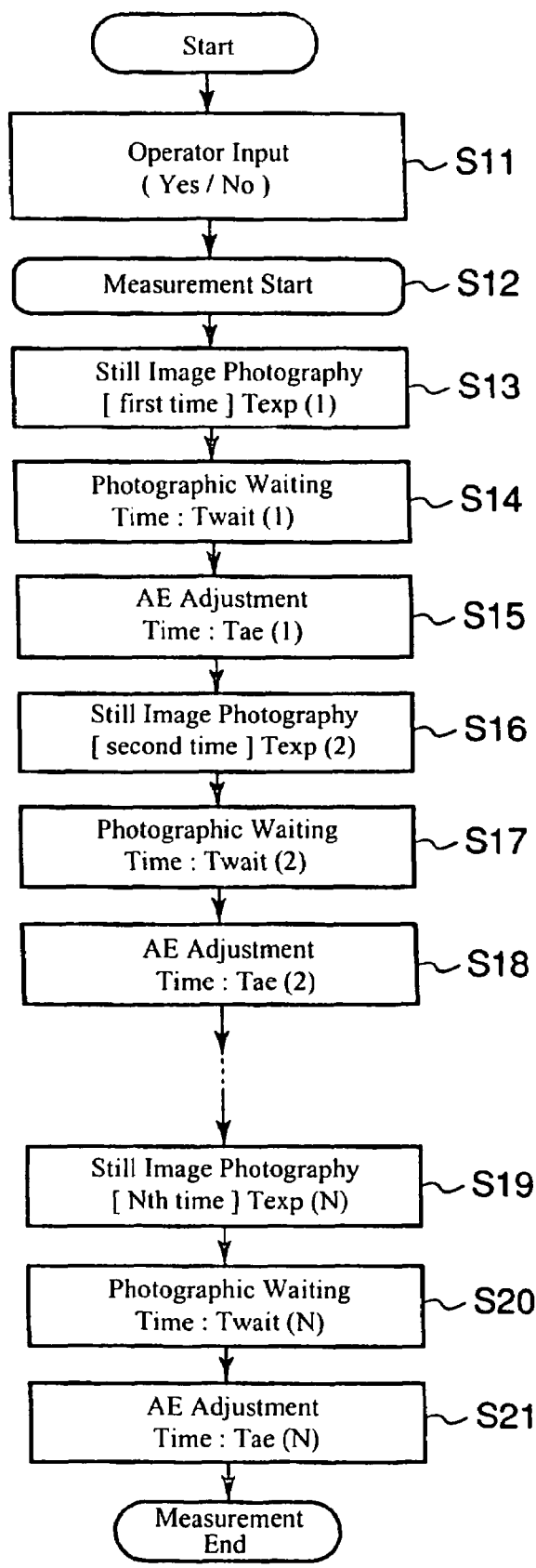
FIG. 4 is a flow chart showing the time-lapse photography steps performed in Embodiment 1.

The flow of operations during measurements for image acquisition during time-lapse photography in Embodiment 1 will now be described with reference to the flow chart shown in FIG. 4. The step above step S11 indicates that this is the start of this sequence of operations. In step S11, a determination is made (Yes/No) by the operator whether processing before the start of image acquisition (i.e., the processing shown in FIG. 3) has occurred. If not, the steps illustrated in FIG. 3 and described above are performed prior to step S12. If so, step S12 is performed next. Step S12 is the start of this sequence of operations that obtains measurements for image acquisition. In step S12, the photographic interval Tint is determined and the count of a timer provided in a microscope control unit (not illustrated) is started. In step S13, image acquisition using an exposure time Texp(1) as a first step of still image photography is commenced. In step S14, after the period Texp(1) ends (i.e., after the first image acquisition of still image photography ends), a shift to a photography waiting time Twait(1) begins. In step S15, AE adjustment is performed during the period Tae(1), which period overlaps with the photographic wait period Twait(1) of step S14. In step S16, after the conclusion of the period Tae(1), the second exposure (i.e., image acquisition) occurs during the period Texp(2). In step S17, following the period Texp(2), a wait period Twait(2) occurs. In step S18, AE adjustment occurs during the adjustment time period Tae(2), which period overlaps with the photographic wait period Twait(2) (step S17). As indicated by the dotted arrow below step S18, this process (i.e., comprising the three steps of exposure, waiting, and adjustment) is repeated until, in step S19, the Nth still image photography step is performed during the exposure time period Texp(N). In step S20, after the conclusion of the time period Texp(N), the photographic wait time period Twait(N) occurs. In step S21, AE adjustment occurs during the time period Tae(N).

The photographic method described in a preceding paragraph prevents the sum of Texp, Tae, and Twait from exceeding the photographic interval even if the exposure time period and the AE adjustment period fluctuate.

The characteristic of this embodiment is that the photographic wait periods Twait(1), Twait(2), ... Twait(N) and the AE adjustment periods Tae(1), Tae(2), ... Tae(N) are allowed to overlap. More specifically, the photographic wait periods Twait(1), Twait(2), ... Twait(N) occur in a series having a constant time interval, and the AE adjustment periods Tae(1), Tae(2), ... Tae(N) are allowed to overlap with the associated photographic wait periods Twait(1), Twait(2), ... Twait(N), respectively.

EMBODIMENT 2

In this embodiment, when the image recording apparatus performs time-lapse photography of a still image using a still camera function, AE adjustment is accomplished only when a difference between the brightness value of a sample at the start of measurement and the brightness value detected every AE adjustment interval exceeds a given value. Exposure Value (hereinafter EV) is a measure of the amount of light received by an image sensor. EV is determined by a combination of the aperture value and the shutter speed, which also depends on the sensitivity of the image sensor. Zero EV is defined by the combination of an aperture value of F/1 and a shutter speed of 1 second at ISO 100. The EV values given by AE adjustment rarely exceed the dynamic range of a CCD even if they are slightly different. Accordingly, when the brightness change of a sample is small, the repeated AE adjustment becomes wasteful. To eliminate such wasteful AE adjustment, AE adjustment is performed only when the absolute value of the difference between the brightness value of a sample at the start of measurement (LG1), i.e., the AE target value, versus the brightness value detected in every AE adjustment interval of a photographic interval Tint (LG2) in time-lapse photography exceeds a pre-set threshold value TH. Stated in mathematical terms, AE adjustment is performed when $|LG1-LG2|>TH$. Thus, the image recording apparatus of Embodiment 2 can eliminate unnecessary AE adjustment because the AE adjustment is accomplished only at appropriate times by performing such a determination.

EMBODIMENT 3

When automatic exposure control (AE) photography is accomplished using the image recording apparatus for a microscope of Embodiment 1, the brightness value can be known only at the time of AE adjustment in time-lapse photography. However, since exposure conditions such as exposure time and AE target values, etc., are not attached to individual images acquired at the time of no AE adjustment, the photographed image and data (i.e., photographic conditions, etc.) at that time must be collated after the end of measurement.

For eliminating such labor, in Embodiment 3, a table that contains exposure conditions for each acquired still image (such as the exposure time, the AE target value, etc.) is recorded in a recording medium (not illustrated in FIG. 1), and the image data of the sample is also recorded with this table. To accomplish this, a recording medium may be provided, for example, inside the microscope control unit 3 (shown in FIG. 1) or it may be detachably provided in the microscope control unit 3.

According to Embodiment 3, still image data along with associated exposure conditions are recorded on a recording medium, and the absolute value of brightness can be found from exposure information recorded separately in an imaging unit. Moreover, the absolute value of the sample brightness can be calculated after the completion of photography. Therefore, not only morphological changes of living cells over time but also changes in luminosity over time can be examined even after the AE adjustment is accomplished during time-lapse photography.

EMBODIMENT 4

In this embodiment, when motion picture photography is conducted using the video camera function of the image recording apparatus, the AE adjustment interval is changed in accordance with the sample brightness value.

Figure 5:
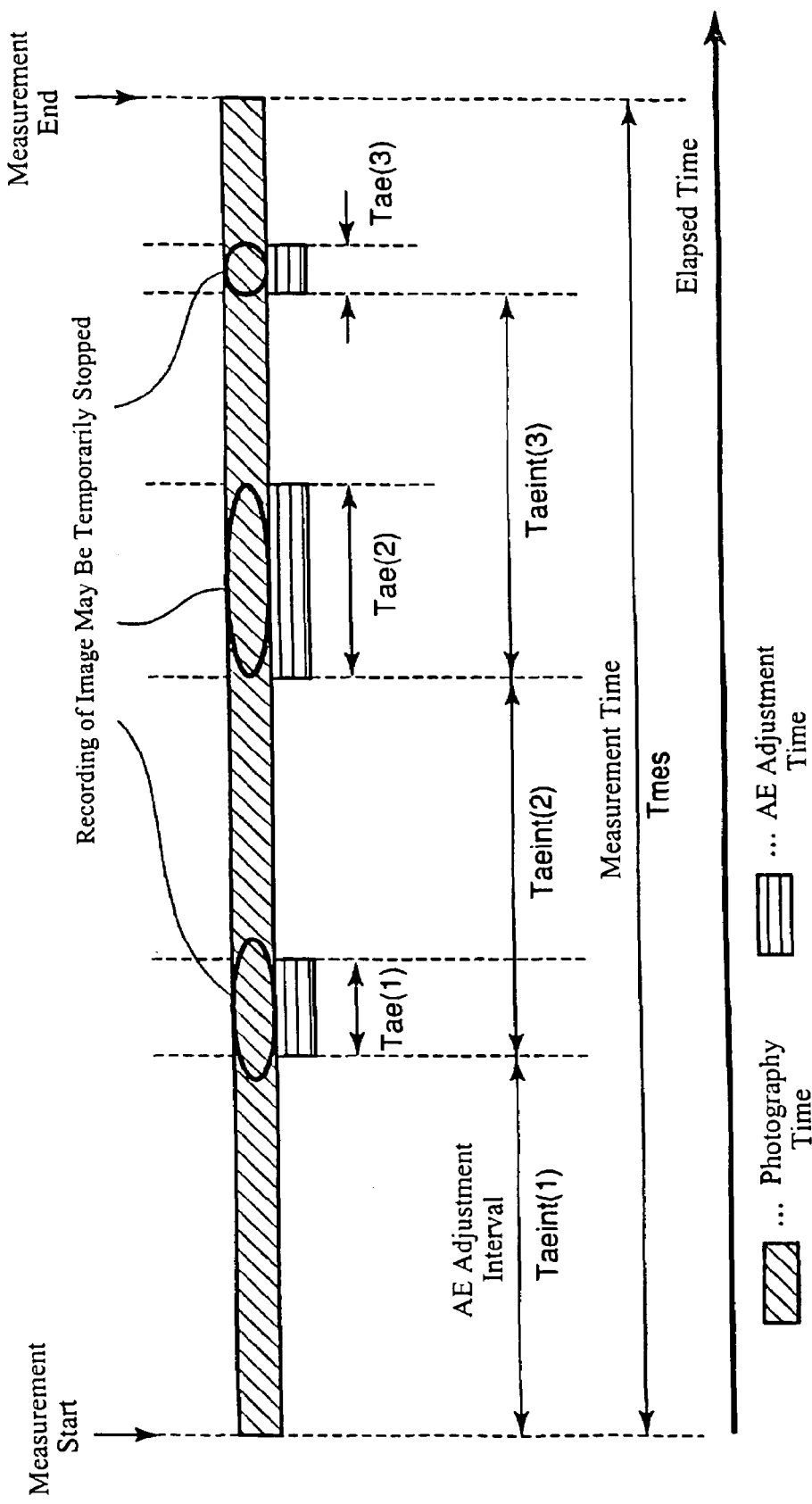
FIG. 5 is a timing chart showing the relationship between measurement procedures versus elapsed time during motion picture photography in Embodiment 4.

Referring to FIG. 5, since a photographic interval Tint does not exist in motion picture photography, AE adjustment intervals Taeint(1), Taeint(2), and Taeint(3) for performing AE adjustment at constant time intervals must be established before motion picture photography begins. The reason that constant time intervals are needed for AE adjustment is to confirm when AE adjustment is to be performed and to make a comparison between the images that are successively acquired. The AE adjustment time periods Tae(1), Tae(2), and Tae(3) vary in duration. As a constraint condition of this mode, the following Condition (3) must be satisfied:

$$\text{Taeint} > \text{Tae[MAX]} \qquad \text{Condition (3)}$$

where

Taeint is the auto exposure adjustment interval, and

Tae[MAX] is the maximum AE adjustment period duration.

Figure 6:
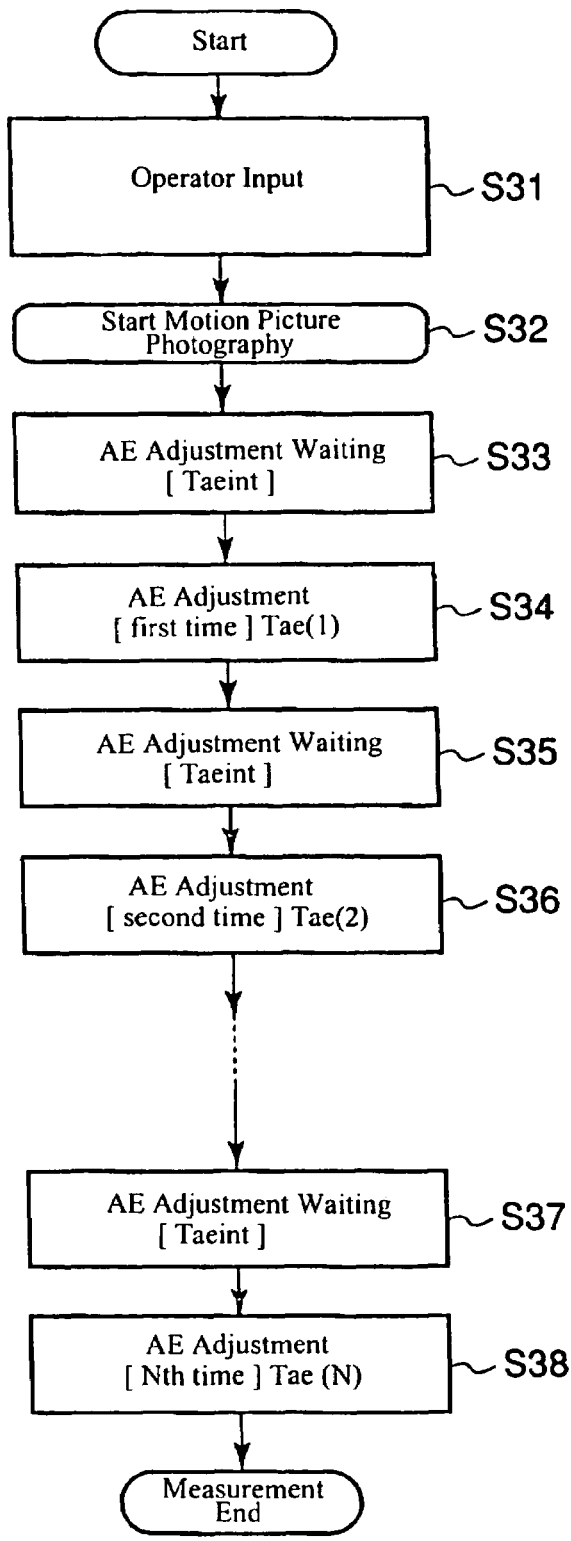
FIG. 6 is a flow chart showing the steps performed during motion picture photography in Embodiment 4.

Motion picture photography in Embodiment 4 will now be described with reference to the flow chart shown in FIG. 6. The oval box above Step S31 indicates the start of this process. Step S31 is similar to step S1 of the flow chart in FIG. 3, in that the operator inputs the AE regions, the AE adjustment interval Taeint, etc., but the inputs now are for motion picture photography rather than time-lapse photography. In step S32, motion picture photography begins and a timer (not illustrated in FIG. 1) that is provided in the microscope control unit 3 is started. In step S33, an AE adjustment waiting period (that begins with the beginning of motion picture photography and that ends with the ending of the pre-set first AE adjustment interval Taeint(1) (as shown in FIG. 5) occurs. In step S34, the first AE adjustment period Tae(1) occurs. During the first AE adjustment period Tae(1), the first AE adjustment is performed. As shown in FIG. 5, the first AE adjustment period Tae(1) occurs during the second AE adjustment interval Taeint(2). Upon the termination of the first AE adjustment period Tae(1), step S35 starts, namely, a second AE adjustment waiting interval occurs, the termination of which is concurrent with the termination of the second AE adjustment interval Taeint(2) (that was input in step S31). During the second AE adjustment waiting interval, motion picture photography is performed in the adjusted exposure state determined in Step S34. In step S36, the second AE adjustment period Tae(2) occurs in which the second AE adjustment is performed. As seen in FIG. 5, the second AE adjustment period Tae(2) occurs during the third AE adjustment interval Taeint(3) that begins with step S36. In step S37, following the termination of the second AE adjustment period Tae(2), motion picture photography is performed in the adjusted state determined in step S36. Similar steps are repeated until, in step S38, the Nth AE adjustment period Tae(N) occurs, followed by motion picture photography being performed until the end of measurement.

By this photographic method, the dynamic range of the CCD is not exceeded, and thus accurate data can be obtained even if the sample brightness markedly changes with the passage of time.

In the case of motion picture photography, image information at the start and end is recorded during a measurement. If a sudden brightness change occurs during the AE adjustment, the lightness/darkness of the image quickly changes, making the image difficult to observe. Accordingly, recording of the image may be temporarily stopped during AE adjustment.

EMBODIMENT 5

In this embodiment, photographic conditions are set to the binning mode during AE adjustment. In Embodiment 4, a constant time interval is used to check the brightness setting based on AE adjustment during motion picture photography. However, when the sample that is the observation target is a sample having a small brightness change, it is likely that the repeated AE adjustments become wasteful. Moreover, during motion picture photography, if photography is interrupted in order to provide AE adjustment, the interruption of motion picture photography will occur in spite of there being essentially no AE adjustment required (i.e., no change of brightness value). However, in Embodiment 5, the photographic conditions are set to the binning mode during AE adjustment, therefore the AE adjustment time is shortened and, consequently, damage to cells can be reduced.

EMBODIMENT 6

Figure 7:
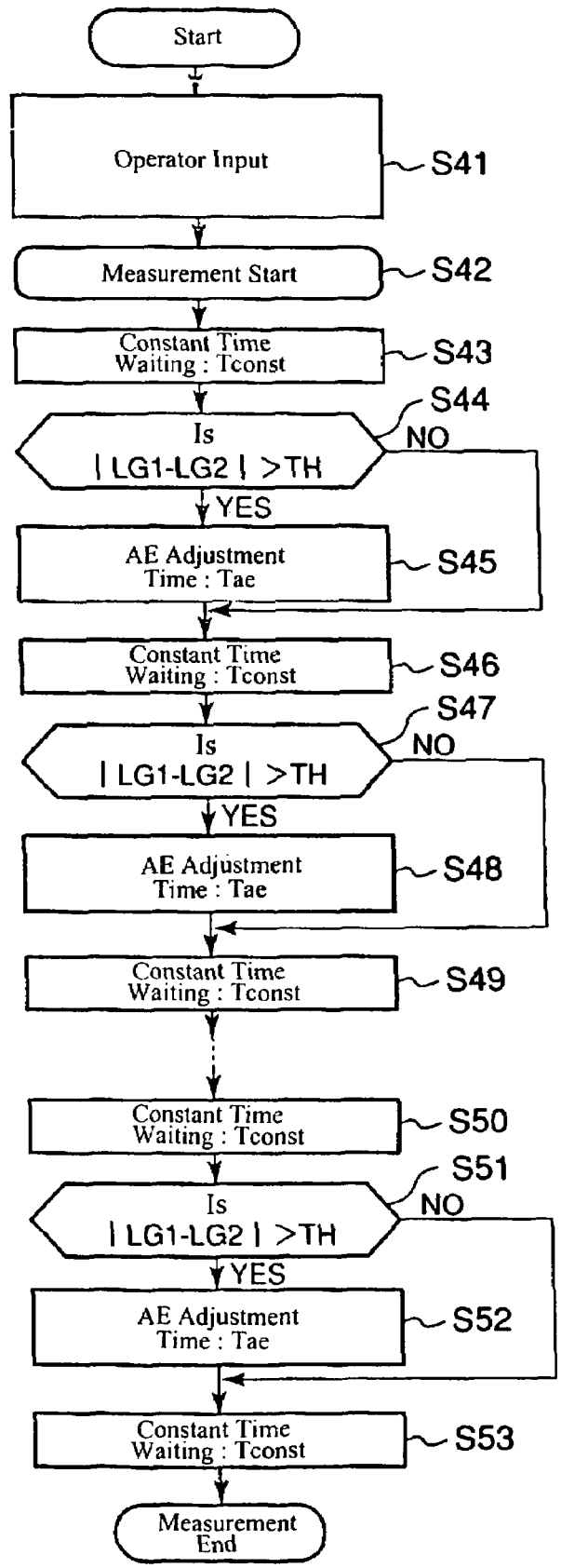
FIG. 7 is a flow chart showing the steps performed during motion picture photography in Embodiment 6.

Embodiment 6 will now be described with reference to the flow chart shown in FIG. 7. The oval box above Step S41 indicates the start of this process. In this embodiment, a comparative determination is made of sample brightness values, and AE adjustment is performed only at appropriate occasions, based on the results of the comparative determination. In step S41, an AE target value (LG1), an AE region, a threshold value (TH), etc. are input by an operator. The maximum value of AE adjustment times (Tae) needed to perform a brightness adjustment for a brightness change from a brightness value in the vicinity of zero to the AE target value LG1, and from the maximum brightness values of brightness to the AE target value LG1, have been previously stored in a database. In step S42 an instruction is given to start motion picture photography. The count of a timer (not illustrated) that is provided in the microscope control unit 3 is begun with the start of motion picture photography. In step S43, a constant waiting time from the start of photography occurs. In step S44, a determination is made as to whether the absolute value of a difference between the brightness value LG1 of a sample at the start of measurement (i.e., the AE target value) versus the brightness value LG2 detected at each photographic interval in time-lapse photography and at each AE adjustment interval during motion picture photography is greater than a pre-set threshold value TH (i.e., it is determined whether |LG1−LG2|>TH. If the absolute value of the difference is greater than the threshold value, (i.e., if |LG1−LG2|>TH is determined as being YES), AE adjustment is determined to be necessary. Flow then proceeds to step S45 wherein AE adjustment is performed. On the other hand, if the absolute value of the difference is not greater than the threshold value (i.e., |LG1−LG2|>TH is determined as being NO), AE adjustment is determined to be unnecessary and flow proceeds directly from step S44 to step S46. In step S46, a constant waiting time occurs. In steps S47-S53, the sequence of steps described in steps S44-S46 is repeated until the measurement end, and AE adjustment is performed, as needed, in accordance with the results of the comparative determination. The end of measurement follows the step S53.

According to this embodiment, AE adjustments when the brightness change does not exceed a prescribed threshold are avoided and AE adjustments are performed only on those occasions when with the brightness change is significant. This eliminates wasteful AE adjustments and, at the same time, reduces image disorders.

EMBODIMENT 7

When automatic exposure control (AE) photography is performed using the image recording apparatus for a microscope according to Embodiment 1, the brightness value can be known only at the time of AE adjustment in time-lapse photography. However the exposure conditions (such as exposure time, AE target value, etc.) are not attached to individual photographed images. Accordingly, in Embodiment 1, the photographed images and exposure condition data must be collated after the end of measurement. In Embodiment 7, on the other hand, the exposure conditions together with the individual image data are recorded on a recording medium for each frame of obtained still images and dynamic motion picture images. The recording medium is provided inside the microscope control unit 3 (shown in FIG. 1) or is detachably provided in the microscope control unit 3.

According to Embodiment 7, an absolute value of brightness can be determined using exposure information recorded separately in an image unit or by using exposure conditions that are recorded with attached image data on a recording medium. Moreover, the absolute value of brightness can be calculated after the end of measurement even if the AE adjustment is performed in a measurement period of time-lapse photography or motion picture photography. Thus, this embodiment enables examining not only morphological changes of living cells over time but also changes in brightness with time.

EMBODIMENT 8

If photography based on AE adjustment (called the AE photography mode hereinafter) is performed at each photographic point in time-lapse photography as described in Embodiments 1 and 2, sample images of roughly uniform brightness and exposure conditions are obtained suitable for examining morphological changes of a sample over time. On the other hand, as disclosed in Japanese Laid-Open Patent Application 2004-233664, a photographic method with constant exposure time (exposure condition) (known as the manual photography mode) is suitable for examining changes in the brightness of light from a sample.

However, when the AE photography mode with different exposure conditions and the manual photography mode are accomplished in time-lapse photography, the time taken for measurement is extended by measuring the respective modes continuously and repeatedly. Moreover, when object cells are damaged by stress to the cells in the first measurement, the second measurement becomes meaningless. Accordingly, two sets of image recording apparatuses must be used to realize both measurements within a measurement time in a single instance of time-lapse photography.

Figure 8:
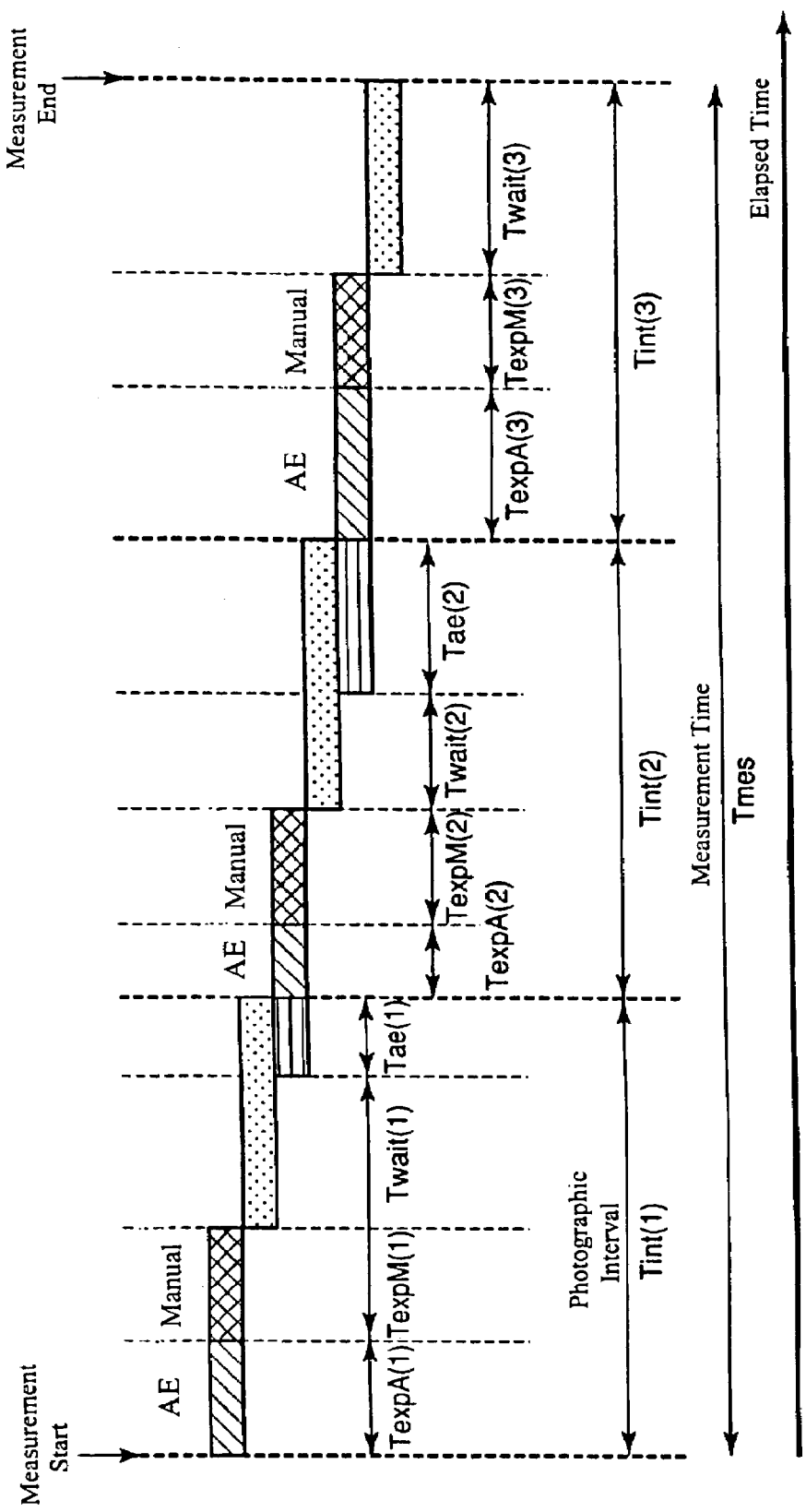
FIG. 8 is a timing chart showing the relationship between measurement procedures versus elapsed time during time-lapse photography in Embodiment 8.
Figure 9:
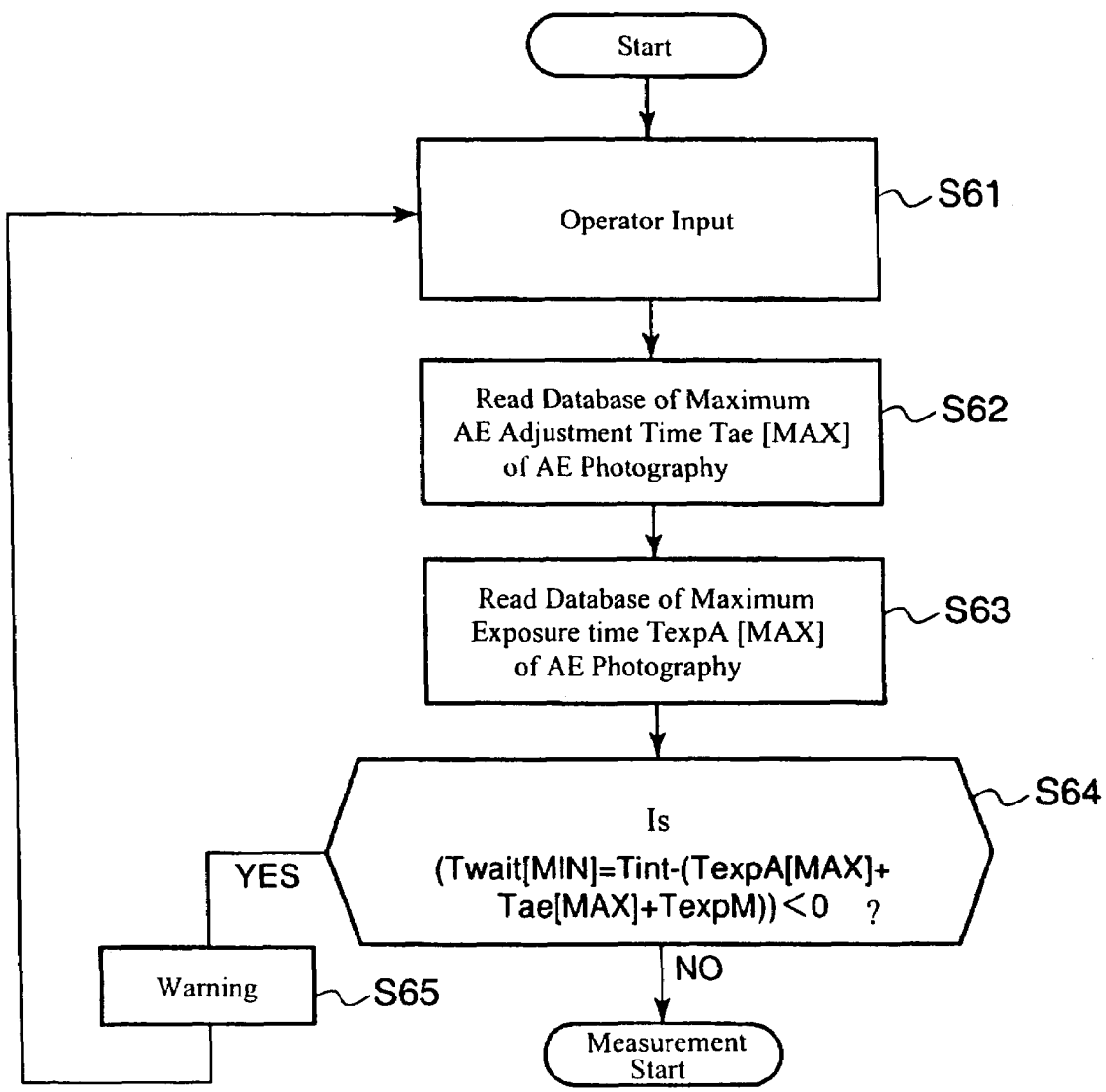
FIG. 9 is a flow chart showing processing steps before the start of measurements in Embodiment 8.

Embodiment 8 enables the photography of plural exposure conditions in a measurement time in a single instance of time-lapse photography. FIG. 8 shows an example of a timing chart of the measurement time in which still image photography using the AE photography mode (AE) and still image photography using the manual photography mode (Manual) are successively accomplished in a single measurement time. In this instance, TexpA(1), TexpA(2) and TexpA(3) are the AE photography mode exposure times for the photographic intervals Tint(1), Tint(2) and Tint(3), respectively, and TexpM(1), TexpM(2) and TexpM(3) are the manual photography mode exposure times for the photographic intervals Tint(1), Tint(2) and Tint(3), respectively. The flow processing that occurs before the start of measurement of Embodiment 8 will now be described with reference to the flow chart shown in FIG. 9.

The oval box above Step S61 indicates the start of this process. As an operating procedure, measurements are made and metering is accomplished in the photographic interval during time-lapse photography. In step S61, the photographic interval Tint, the AE target value, the AE region designated for AE photography, and the exposure time necessary for manual photography mode are input by an operator.

In step S62, the maximum AE adjustment time Tae[MAX] of the AE photography mode is read from a database. In step S63, the maximum exposure time TexpA[MAX] of the AE photography mode is read from a database. In step S64, the minimum photographic wait time Twait[MIN] is calculated using the fact that it equals: Tint−(TexpA[MAX]+Tae[MAX]+TexpM), and a determination whether Twait[MIN]<0 is made. If the determination of whether Twait[MIN]<0 is YES, a warning is issued in step S65 to the effect that a measurement cannot be made using this setting. For example, if the setting of the consecutive photography speed is too high, flow is returned to step S61, so that the operator can input a different (i.e., slower) value of the consecutive photography speed. On the other hand, if the determination whether Twait[MIN]<0 is NO, measurement commences.

As shown in the timing chart of FIG. 8, during time-lapse photography, the operating procedure ensures that the photographic wait time Twait occurs within the photographic interval Tint, and that measurements are performed without problems even if the AE photography mode (designated as AE in FIG. 8) and the manual photography mode (designated as Manual in FIG. 8) are successively used to acquire images.

A method for measuring (i.e., acquiring images) during AE photography mode and during manual photography will be described for an image recording apparatus for a microscope according to Embodiment 8, but the method can be easily applied to other photographic conditions. For example, observation images corresponding to various photographic conditions can be obtained in a single measurement by using this embodiment: (1) during binning processing or when no binning processing occurs, (2) in the case where the illumination light is either bright or dim, (3) in cases that stage positions are different from each other, as in the examination of multiple cells, and (4) in cases where the Z-axis stage must be moved in order to acquire images of cells having a thickness so as to focus on different portions of an object or specimen, such as the cell surface or the cell nuclei, etc.

EMBODIMENT 9

In this embodiment, the light modulation is performed by the driving unit 4 and an operation for reducing the intensity of illumination of a reflection illumination light source 8 or a transmission illumination light source 15 is performed according to an instruction from the microscope control unit 3 (shown in FIG. 1). By this operation, when AE adjustments in time-lapse photography and in motion picture photography (described in Embodiment 1 above) frequently occur, damage to the sample cells can be reduced because the light intensity irradiated onto the sample can be reduced.

EMBODIMENT 10

In this embodiment, the AE adjustment time Tae is shortened by performing photography accompanied by binning processing. When the AE photography mode is executed, binning processing is established. During the setup of exposure conditions in the AE photography mode, by selecting binning processing, the AE adjustment time and the exposure time can be shortened. Accordingly, in Embodiments 1 and 2, the above-mentioned Conditions (1) and (2) can be satisfied during binning processing even if the Conditions (1) and (2) are not satisfied in normal exposure conditions.

Moreover, the AE adjustment time and the exposure time are shortened, and the irradiation time of the reflection illumination light and the transmission illumination light onto the sample are shortened. Thus, damage to living cells of the sample 11 can be reduced by selecting binning processing.

According to this embodiment, when observation images show time-lapse changes of living cells, image data of roughly uniform brightness can be obtained in the measurement period without impairing the sensitivity and gradation characteristics even if the brightness of the specimen changes from a bright region to a dark region (or vice versa).

Furthermore, during time-lapse photography, the time spent in image acquisition measurement and thus damage imparted to sample cells can be reduced because experimental data of plural photographic conditions can be obtained in a single measurement.

The invention described above can provide the following beneficial effects.

(1) Automatic exposure (AE) control may be performed at an appropriate interval in the photographic period in an image recording apparatus having both motion picture photography and time-lapse photography capability. Thus, image data can be obtained with a good S/N ratio and a roughly uniform brightness without exceeding the dynamic range of a solid state image pickup device (CCD), even when the brightness of a sample changes significantly with the passage of time.

(2) During automatic exposure (AE) control, information regarding exposure conditions can be recorded simultaneously with image data on a recording medium, thereby eliminating the need to collate data if this information were to be stored separately.

(3) During time-lapse photography, observation images acquired under plural photographic conditions can be recorded in a single measurement time by successively performing recording under plural photographic conditions when acquiring still images at a constant time interval. Thus, not only can data of the plural photographic conditions be obtained in a single measurement time, but also the stress imparted to living cells by the measurement can be reduced. Moreover, it is unnecessary to increase the scale of a system by using plural image recording apparatus or photographic mechanisms.

(4) During time-lapse photography, the intensity of illumination on a sample can be reduced when automatic exposure (AE) control is performed at the time of acquiring still images by performing binning processing during automatic exposure (AE) control.

According to the present invention, image data having a substantially uniform brightness can be acquired during a measurement period without impairing the sensitivity and gradation characteristics of the image data even when the brightness of a sample changes. Moreover, the present invention enables images to be acquired under plural photographic conditions during a single measurement period of time-lapse photography, thereby shortening the time spent in acquiring images and reducing damage to the cells.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An image recording apparatus in combination with a microscope that includes a driving unit that controls a reflection illumination light source and a transmission illumination light source which illuminate a sample containing a living cell, said combination performing time-lapse photography of said sample, the image recording apparatus comprising:

means for accomplishing exposure control at a desired time interval during a photographic period; and means for establishing exposure conditions for photography that are within a dynamic range inherent in a CCD solid state image pickup device of the image recording apparatus; wherein the means for establishing exposure conditions establishes exposure conditions only when the luminous brightness of the sample at the start of measurement and the brightness value detected at a time interval changes by a specified threshold value so that a fluorescent image of the sample is recorded at a roughly uniform brightness, and said driving unit controls shutters such that, when waiting for photography in time-lapse photography, said sample is shielded from said reflection illumination light source and said transmission illumination light source.

2. The image recording apparatus of claim 1, and further comprising means to input exposure control data to the image recording apparatus before photography begins.

3. The image recording apparatus of claim 1, and further comprising: means to record image data, as well as information about the photographic conditions of said image data, on a recording medium.

4. The image recording apparatus according to claim 3, and further comprising:

means to acquire images under different photographic conditions successively when still images are obtained at a constant time interval; wherein the means to record image data on a recording medium also records information about the different photographic conditions on the recording medium.

5. The image recording apparatus of claim 1, and further comprising: means for reducing the intensity of illumination when acquiring still images during time-lapse photography.

6. The image recording apparatus of claim 1, wherein the means for accomplishing exposure control performs binning processing in obtaining still images during time-lapse photography.

7. An image recording method for a microscope that performs time-lapse photography of a sample containing a living cell using an image recording apparatus mounted on the microscope, said microscope including a driving unit that controls a reflection illumination light source and a transmission illumination light source which illuminate said sample, said image recording method comprising the following steps: (a) inputting a desired time interval for a measurement period; (b) performing AE adjustment only when a difference between the brightness value of said sample at the start of measurement and the brightness value detected every AE adjustment interval exceeds a given value; and (c) recording a microscope observation image by controlling the sum of the exposure adjustment time and the exposure time so as not to exceed the desired time interval; wherein the microscope observation image is a fluorescent image of a living cell, and said driving unit controls shutters such that, when waiting for photography in time-lapse photography, said sample is shielded from said reflection illumination light source and said transmission illumination light source.

8. A computer readable recording medium that stores an image recording program used by an image recording apparatus when the image recording apparatus is attached to a microscope so as to perform time-lapse photography of images of a sample containing a living cell observed by the microscope, said image recording program comprising the following steps:

(a) receiving as input a desired time interval for a measurement period;

(b) in accordance with the desired time interval input in step (a), determining an exposure adjustment time and an exposure time for still picture photography; and (c) controlling the sum of the exposure adjustment time and the exposure time so as not to exceed said desired time interval while recording observation images from the microscope; wherein the observation images are fluorescent images of a sample containing a living cell, and the computer readable recording medium also stores instructions that control shutters which shield the sample from excitation lights at the time of waiting during time-lapse photography so as to not irradiate light onto the sample during waiting periods.

9. An image recording apparatus in combination with a microscope that includes a driving unit which controls a reflection illumination light source and a transmission illumination light source that illuminate a sample containing a living cell, said combination performing time-lapse photography of said sample, the image recording apparatus comprising:

a solid state image pickup device for picking up an observation image of said sample observed by the microscope, the observation image being a fluorescent image;

means for an operator to set exposure conditions that include at least a pre-determined time interval that defines the photographic interval and a target exposure value of time-lapse photography;

means for finding the maximum exposure adjustment time and the maximum exposure time of the next image to be acquired by the solid state image pickup device in accordance with the target exposure level;

a control means for controlling the sum of the obtained maximum exposure adjustment time and the maximum exposure time so as not to exceed the pre-determined time interval; and means for recording an output of the solid state image pickup device on a recording medium;

wherein said driving unit controls shutters such that, when waiting for photography in time-lapse photography, said sample is shielded from said reflection illumination light source and said transmission illumination light source.

10. The image recording apparatus of claim 9, wherein the exposure adjustment time is determined just before the next still image is acquired.

* * * * *